W. B. PETTUS.
WATER GAGE VALVE.
APPLICATION FILED MAY 13, 1913.
1,087,821.   Patented Feb. 17, 1914.
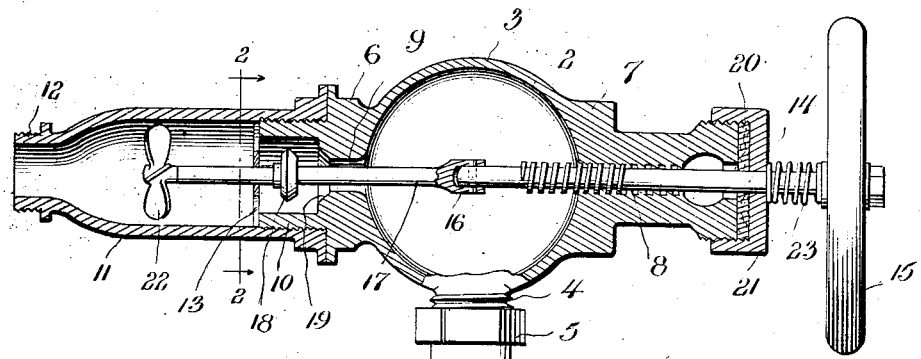
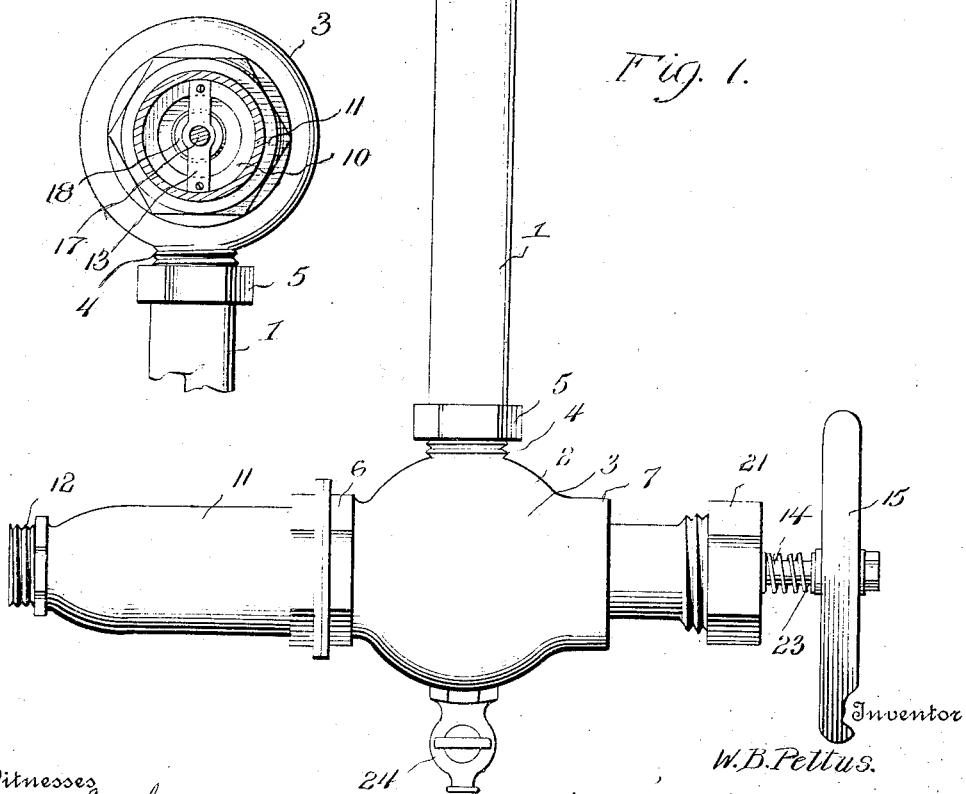
Witnesses
William Smith
John J. McCarthy
Inventor
W. B. Pettus.
By Victor J. Evans
Attorney

UNITED STATES PATENT OFFICE.

WILLIAM B. PETTUS, OF ATLANTA, GEORGIA.

WATER-GAGE VALVE.

1,087,821.

Specification of Letters Patent.

Patented Feb. 17, 1914.

Application filed May 13, 1913. Serial No. 767,380.

*To all whom it may concern:*

Be it known that I, WILLIAM B. PETTUS, a citizen of the United States, residing at Atlanta, in the county of Fulton and State of Georgia, have invented new and useful Improvements in Water-Gage Valves, of which the following is a specification.

This invention relates to improvements in valve structures and has particular application to valves for the water glasses of steam boilers.

In carrying out the present invention, it is my purpose to provide a valve structure which will be found especially useful in conjunction with the water glasses of steam boilers and which will close automatically in the event of the water glass breaking, thereby eliminating the escape of steam and water from the boiler.

It is also my purpose to provide a valve of the class described which, when the water glass breaks, will be automatically closed, under the action of the steam or water seeking its way to the fractured glass.

Furthermore, I aim to provide a valve structure of the type set forth which will embrace the desired features of simplicity, efficiency and durability coupled with cheapness of cost in manufacture, marketing and installation and which may be operated manually so as to cut off communication between the boiler and the water glass.

With the above and other objects in view, the invention consists in the construction, combination and arrangement of parts hereinafter set forth in and falling within the scope of the claim.

In the accompanying drawing, Figure 1 is a view in elevation of a water glass equipped with valves each constructed in accordance with the present invention, one of the valves being shown in section. Fig. 2 is a section on the line 2—2 of Fig. 1.

Referring now to the accompanying drawing in detail, the numeral 1 designates a water glass adapted to be in communication with the water column of a steam boiler through the medium of valves 2, 2 located at the opposite ends of the water glass and controlling communication between the latter and the water column.

The valves 2, 2 are substantially identical in construction and each comprises a hollow spherical shaped body 3 formed at an appropriate point with a nipple 4 equipped with a union or coupling 5 designed to receive the respective end of the water glass 1. At diametrically opposite points, the body 3 is formed with outwardly projecting bosses 6, 7, the boss 7 being formed with a longitudinally threaded bore 8, while the boss 6 is formed with a passage 9 coaxial with the bore 8 in the boss 7 and of a diameter greater than that of said bore 8. The outer extremity of the boss 6 has suitably connected thereto a collar or sleeve 10 extending outwardly of such boss and threaded exteriorly to receive a tubular bonnet or hood 11 having the free end thereof restricted to provide a coupling member 12 whereby the free end of the bonnet may be tapped into the water column of the boiler 1. Connected to the sleeve 10 at diametrically opposite points and extending transversely thereof is a guide strip 13 formed with an aperture disposed in axial alinement with the passage 9 and the bore 8 in the bosses 6 and 7 respectively, while threadedly engaging the wall of the bore 8 and adapted for rotation therein is a shank 14 equipped at its outer extremity with a hand wheel 15 and having the inner extremity thereof seated within a socket 16 formed in the adjacent end of a valve stem 17 disposed within the aperture in the guide strip 13 and the passage 9 and carrying, within the sleeve 10, a valve disk 18 adapted to coöperate with a valve seat 19 formed at the outer extremity of the passage 9. Suitable packing 20 surrounds the shank 14 at the outer extremity of the boss 7 and is held in place by means of a packing nut 21 so that leakage at this point will be avoided.

When the parts are in the positions illustrated in Fig. 1 of the drawing, it will be seen that communication is established between the boiler and the water glass 1 so that the level of the water within the boiler may be readily determined. Should it be desired to cut off communication between the boiler, or the water column of the boiler, and the water glass, the hand wheel 15 is rotated with the effect to rotate the shank 14 and move the latter longitudinally of the valve casing, incident to the threads thereon engaging the threaded wall of the bore 8, thereby moving the valve 18 into engagement with its seat 19.

In order that the valve disk 18 will be moved to closed position automatically in the event of the water glass breaking, I secure to the inner end of the valve stem 17 a number of blades 22 arranged radially of the stem and disposed at a helical pitch with respect to such stem so that when the water or steam tends to flow out of the boiler by way of the broken water glass, such water or steam will act upon the blades 22 and thereby rotate the valve stem 17 with the effect to move the valve disk 18 into engagement with its seat 19 and thereby cut off communication between the boiler and the atmosphere.

To overcome the friction set up at the point of contact between the packing 20 and the shank 14 and at various other points, so that the blades 22 will respond immediately that the water glass is fractured or broken, I coil about the shank 14 between the packing nut 21 and the handle 15, a tension spring 23 which, when the valve disk is moved to open position is placed under tension so that the same will react and assist in the rotating of the shank and stem.

From the foregoing description, taken in connection with the accompanying drawing, the construction, mode of operation and manner of employing my invention will be readily apparent. It will be seen that I have provided a valve which is especially useful for effecting a connection between a steam boiler and the water glass thereof, and which, when the glass breaks, will close automatically so as to prevent the escape of steam or water from the boiler. The lower valve 2 is preferably equipped with a drain cock 24 so that the water glass and valve casings may be drained out when desired. It will be observed that the valve may be opened and closed manually independently of the blades 22, while the latter will act immediately that the sight glass is broken and so close the valve independently of manual operation.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

In water glass valve construction, a water glass a spherical shaped body, a connection between said body and water glass, bosses formed on said body at diametrically opposite points and extending outwardly therefrom, one of said bosses being formed with a threaded bore and the other with a passage coaxial with the bore, a sleeve connected to the last named boss and having a passage therein and extending outwardly therefrom, a bonnet carried by said sleeve, a shank threadedly engaging the threaded bore in the other boss and adapted for longitudinal movement therein, a handle for rotating said shank, a valve stem disposed within said passage and extending beyond the sleeve, a valve disk carried by said stem, said passage being formed with a seat adapted to receive said disk, said shank and stem having connected together blades upon the free end of said stem and adapted to close the valve automatically in the event of the water glass breaking, and a spring surrounding said shank and designed to assist said blades in closing the valve.

In testimony whereof I affix my signature in presence of two witnesses.

WILLIAM B. PETTUS.

Witnesses:
 GEO. D. RICE,
 H. F. FRICK.